No. 814,875. PATENTED MAR. 13, 1906.
M. P. SCHETZEL.
RACE TRACK OBSERVATORY.
APPLICATION FILED MAY 10, 1905.

2 SHEETS—SHEET 1.

Witnesses,
Chas. E. Chapin.

Inventor,
Max P. Schetzel
By Geo. H. Strong. Atty

No. 814,875. PATENTED MAR. 13, 1906.
M. P. SCHETZEL.
RACE TRACK OBSERVATORY.
APPLICATION FILED MAY 10, 1905.
2 SHEETS—SHEET 2.
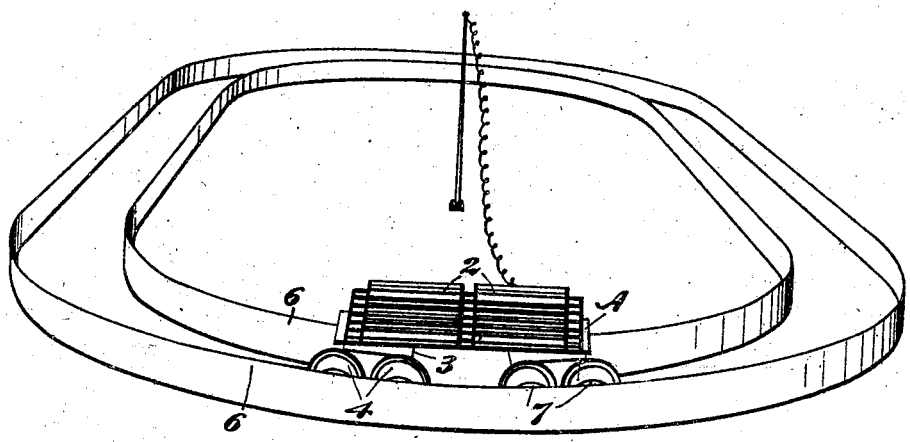

UNITED STATES PATENT OFFICE.

MARX PETER SCHETZEL, OF OAKLAND, CALIFORNIA.

RACE-TRACK OBSERVATORY.

No. 814,875.  Specification of Letters Patent.  Patented March 13, 1906.

Application filed May 10, 1905. Serial No. 259,769.

*To all whom it may concern:*

Be it known that I, MARX PETER SCHETZEL, a citizen of the United States, residing at Oakland, in the county of Alameda and State of California, have invented new and useful Improvements in Race-Track Observatories, of which the following is a specification.

My invention relates to a device for more conveniently and closely observing horse and other races which take place upon endless tracks.

It consists of a car provided with seats and conveniences, but mounted upon wheels and means for insuring the direction of travel of the car and the disposition of the guides.

It also comprises details of construction which will be more fully explained by reference to the accompanying drawings, in which—

Figure 1:
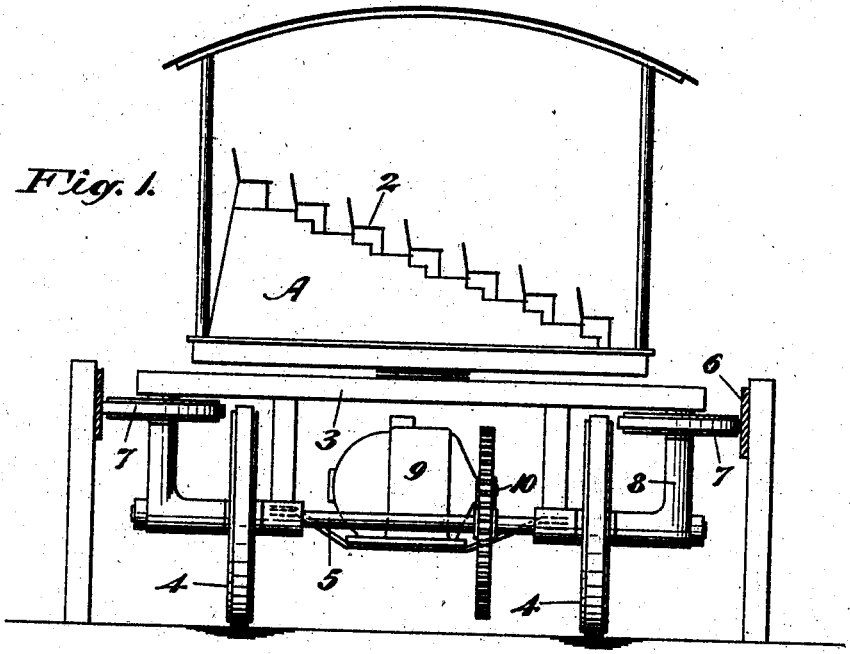
Figure 2:
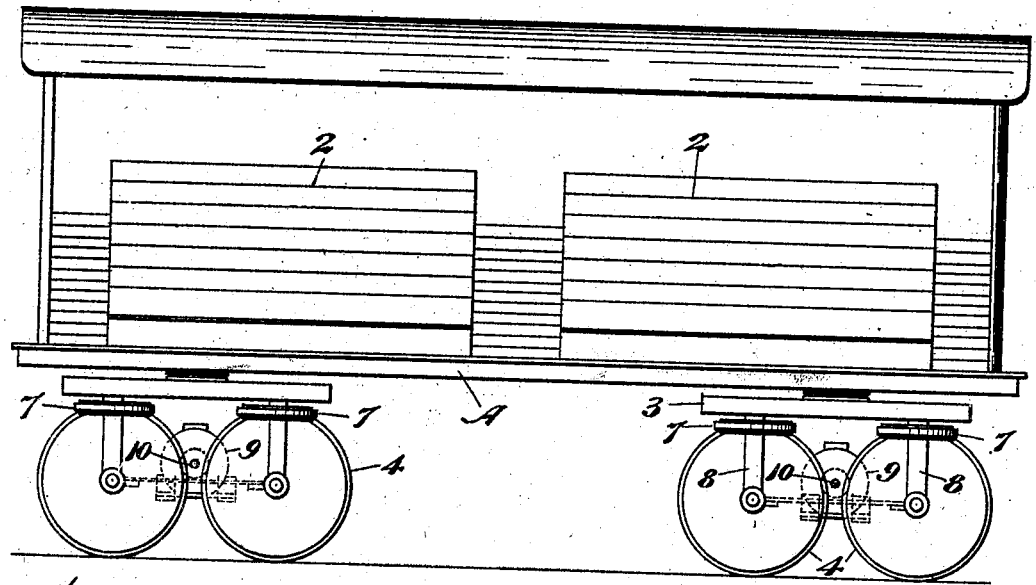

Figure 1 is an end elevation of my car. Fig. 2 is a side elevation of same. Fig. 3 is a perspective view of car and track.

It is the object of my invention to provide a comfortable and convenient observation-car for spectators and means by which said car shall closely follow races which take place upon circular or oval tracks.

As shown in the drawings, A is the car, which may be properly roofed over and have seats arranged in tiers, as shown at 2, rising from the front to the rear side of the car. The car-body may be made of any suitable or desired length, and the arrangement of the seats may be similar to that of an ordinary grand stand. The car-body is mounted upon suitable pivoted trucks 3, having wheels 4, mounted upon axles 5, which are journaled upon the truck-frame in any usual or suitable manner. The peripheries of the truck-wheels are grooved, and preferably solid-rubber tires are fitted into the grooves. The wheels are designed to run upon any suitable surface, which may be made of macadam or concrete and sufficiently smooth for the purpose. The track may be arranged either inside or outside of the main race-track and substantially parallel therewith and at such distance therefrom as may be found most convenient. Upon each side of the surface upon which the car is designed to run are stout rails or supports, and these rails are formed with or carry upon them tracks 6.

7 represents wheels having, preferably, rubber tires upon the periphery, and these wheels are journaled upon vertical supports or standards 8 at each side of the car and near each end, so that the wheels turn in horizontal planes. These wheels are of such diameter as to project a little beyond the sides of the car and to run in contact with the tracks 6, the wheels turning substantially horizontal upon their axial supports.

By this construction and by the use of a sufficiently smooth surface and the vertically-disposed tracks 6 a cheap roadway may be constructed for the travel of the cars and to maintain them in proper relation with the race-course about which they are constructed.

The cars are provided with any suitable or well-known form of motor. It will be found that an electrical motor will sufficiently fill the requirements of such motor, or motors may be installed upon the cars so as to propel them. I have here illustrated such a motor as located at 9 and having a pinion-shaft parallel with the axles of the bearing-wheels 4, as shown at 10. A pinion mounted upon this shaft may be made to engage with corresponding surfaces turnable in unison with the wheels 4 and through which power is transmitted to said wheels. I have found that a very suitable arrangement is to provide the pinions with any suitable frictional surface which may run in contact with similar surfaces carried by the axles of the wheels 4. The simpler method would be to allow the pinions to travel in contact with the peripheries of the wheels 4, so that power is transmitted directly from the motor to each pair of wheels of the truck. With this or equivalent device it will be understood that the car may be set in motion either at the starting of the race or just previously thereto and may be then kept parallel with the course and follow the race in close proximity until completed. Such a device will be particularly useful for the judges who are depended upon to see that no unfair advantage is taken of any of the competitors.

Having thus described my invention, what I claim, and desire to secure by Letters Patent, is—

1. In a race-track observation-car, a car-body having seats arranged thereon, axles for said car said axles provided with main bearing-wheels and having, also, vertically-disposed end standards, wheels journaled to turn in a horizontal plane on said standards, and vertically-disposed tracks or rails against which the last-named wheels travel.

2. An endless race-track, and a second track substantially concentric therewith, and an observation-car having wheels adapted to travel upon said second track, vertically-journaled guide-wheels carried upon the car and inclosing rails or tracks against which said guide-wheels travel.

3. An endless race-track and a second track concentric therewith, said second track having interior and exterior concentric rails or tracks, a car with wheels to travel on the second track-surface, and guide-wheels carried by the car and adapted to travel between and against the guide-rails.

4. The combination with a race-track, of a second track conforming substantially to the contour thereof and having a substantially horizontal, endless annular flat surface, a car adapted to travel thereon, vertically-disposed tracks or guides for the car, and wheels journaled upon the car so as to travel against said tracks.

In testimony whereof I have hereunto set my hand in presence of two subscribing witnesses.

MARX PETER SCHETZEL.

Witnesses:
S. H. NOURSE,
HENRY P. TRICOU.